UNITED STATES PATENT OFFICE.

MELVILLE F. COOLBAUGH AND ELWYN H. QUINNEY, OF RAPID CITY, SOUTH DAKOTA.

PROCESS OF PRODUCING SOLUBLE SALTS OF POTASSIUM AND ALUMINUM.

1,125,007.

Specification of Letters Patent.

Patented Jan. 12, 1915.

No Drawing.

Application filed June 2, 1913. Serial No. 771,243.

*To all whom it may concern:*

Be it known that we, MELVILLE F. COOLBAUGH and ELWYN H. QUINNEY, citizens of the United States, and residents of Rapid City, in the county of Pennington and State of South Dakota, have made certain new and useful Improvements in Processes of Producing Soluble Salts of Potassium and Aluminum, of which the following is a specification.

Our invention relates to improvements in processes for producing soluble salts of potassium and aluminum from silicious and argillaceous earths, rocks or minerals in which compounds of these elements exist in an insoluble form.

An object of our invention is to provide a simple process for producing potassium and aluminum sulfates, and one which is inexpensive.

A further object of our invention is to provide a process which is applicable to rocks, earths or minerals which are found in abundance, and which form therefore a convenient supply of raw material.

Other objects and advantages will appear in the following specification, and the novel steps of the process will be particularly pointed out in the appended claims.

In carrying out our process, we make use of feldspar, leucite, or other rocks, shales, or clays. These are first crushed or ground to pass through an eighty mesh screen. The powdered material is then thoroughly mixed with gypsum or limestone, which has been previously crushed to the same fineness. The proportions of the argillaceous and silicious rock, and the gypsum or limestone, will vary in accordance with the composition of the rock, earth or minerals. For the treatment of feldspar rock containing ten per cent. of potash, we prefer to use one part of the feldspar, by weight, to one and eight-tenths parts of gypsum. When limestone is used, the proportion is one part of feldspar to one and one-tenth parts, by weight, of limestone. The proportion of gypsum and limestone to be used may be widely varied when used with the different rocks, earths, or minerals. The gypsum should be added in the proportion of two and eight-tenth parts of gypsum, by weight, to one part of silica, by weight, contained in the feldspar, leucite, and other rocks, shales, and clays, while if limestone is used, one and seven-tenths parts of limestone by weight is added for each one part of silica by weight contained in the silicious materials. Where the rocks, earths or minerals contain lime as one of their constituents, the amount of lime or gypsum to be used should be decreased according to the amount already contained.

The mixture of the silicious or argillaceous material and the gypsum or limestone is heated to incipient fusion, is then cooled quickly and crushed to a powder. It is then leached with water containing, for the treatment of ordinary feldspar, three and five-tenths parts of sulfuric acid, by weight, to each one part, by weight, of feldspar. The proportion of sulfuric acid to be used in the treatment of feldspar and the other rocks, earths or minerals will depend upon the proportion of potash and alumina contained therein. For the most efficient treatment one and two-tenths parts of sulfuric acid by weight is used to each one part of potash by weight and three parts of sulfuric acid by weight to each one part of alumina by weight. If too little sulfuric acid is used the potash and alumina will not be dissolved out to such an extent as if the approximate proportions stated above are used, and if too much sulfuric acid is used there will be a tendency to bring down the lime in such quantities as to interfere with the cystallization of the potash and alumina. After the leaching has been accomplished the potash and alumina as potassium and aluminum sulfates are then separated from the solution by crystallization. The yield of potash and alumina is ordinarily from ninety to ninety-two per cent. of potash, and from ninety-three to ninety-eight per cent. of alumina contained in the feldspar or the other rocks, earths or minerals treated.

In the foregoing specification, the specific examples are given by way of illustration only, and it will be understood that the proportions, in which the various substances are brought together, may vary without departing from the spirit and the scope of the invention.

We claim:

1. The herein described process of producing soluble salts of aluminum and potassium from silicious rocks, earths or minerals containing insoluble compounds of potassium and aluminum, which consists in reducing the rocks, earths, or minerals to a powdered form, mixing therewith limestone, heating the mixture to incipient fusion, cooling quickly, leaching the product with dilute sulfuric acid in the approximate proportions of one and two-tenths sulfuric acid by weight to each one part of potash by weight and three parts of sulfuric acid by weight to each one part of alumina by weight, and subsequently separating the potassium and aluminum sulfates from the resulting solutions.

2. The herein described process of producing soluble salts of aluminum and potassium from silicious rocks, earths, or minerals containing insoluble compounds of potassium and aluminum, which consists in reducing the rocks, earths or minerals to powdered form, mixing therewith limestone in the approximate proportions of one and seven-tenths parts of limestone, by weight, to each one part of silica, by weight, contained in said rocks, earths, or minerals, heating the mixture to incipient fusion, cooling quickly, leaching the product with dilute sulfuric acid, and separating the potassium and aluminum sulfates from the resulting solutions, by crystallization.

3. The herein described process of producing soluble salts of aluminum and potassium from silicious rocks, earths, or minerals containing insoluble compounds of potassium and aluminum, which consists in reducing the rocks, earths, or minerals to a powdered form, mixing therewith limestone in the approximate proportions of one and seven-tenths parts of limestone by weight to each one part of silica by weight contained in said rocks, earths, or minerals, heating the mixture to incipient fusion, cooling quickly, leaching the product with dilute sulfuric acid in the approximate proportions of one and two-tenths parts of sulfuric acid by weight to each one part of potash by weight and three parts of sulfuric acid by weight to each one part of aluminum by weight, and subsequently separating the potassium and aluminum sulfates from the resulting solutions by crystallization.

MELVILLE F. COOLBAUGH.
ELWYN H. QUINNEY.

Witnesses:
FRANK M. LOCKHART,
CLEMENT L. PERRYMAN.

Copies of this patent may be obtained for five cents each, by addressing the "Commissioner of Patents, Washington, D. C."